Nov. 26, 1929.  R. W. BISSELL  1,737,352
PULLEY MOUNTING
Filed Sept. 2, 1927
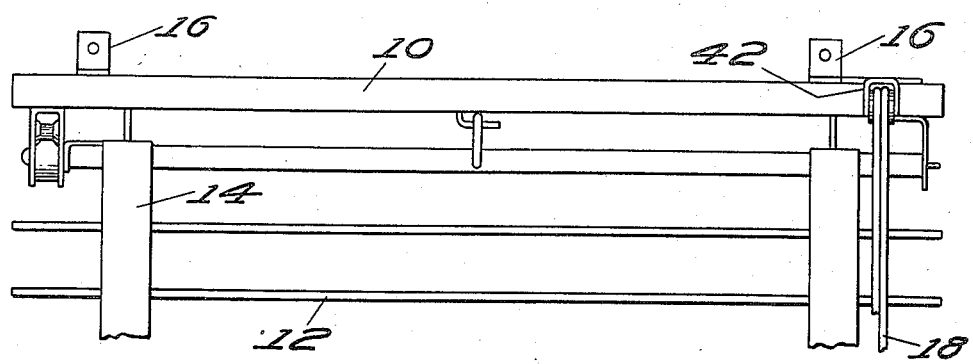
FIG. 1
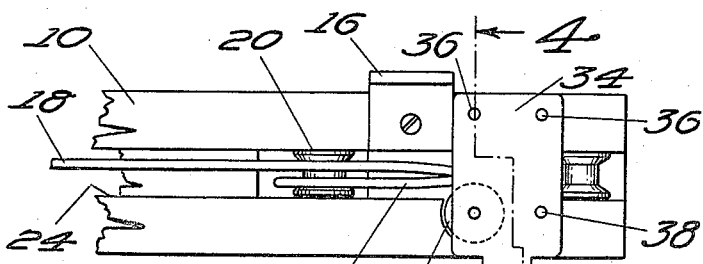
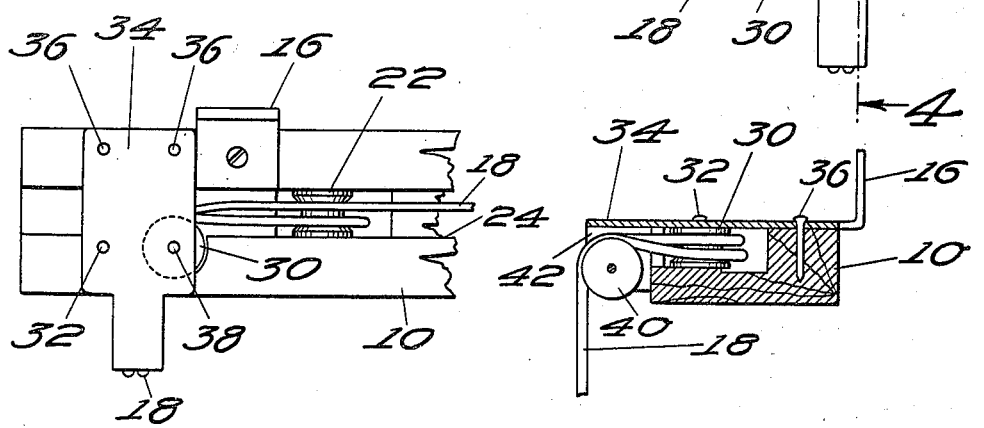
FIG. 3  FIG. 4
ROBERT W. BISSELL
INVENTOR
PER
Albert J. Fihe
ATTORNEY.

Patented Nov. 26, 1929

1,737,352

UNITED STATES PATENT OFFICE

ROBERT W. BISSELL, OF PITTSBURGH, PENNSYLVANIA, ASSIGNOR TO WESTERN BLIND AND SCREEN COMPANY, OF LOS ANGELES, CALIFORNIA, A CORPORATION OF CALIFORNIA

PULLEY MOUNTING

Application filed September 2, 1927. Serial No. 217,055.

This invention relates to an improved pulley mounting and has for one of its principal objects the provision of such a mounting which shall be capable with a slight adjustment, of being used in either a right or a left hand position with respect to the direction of the applied forces.

One of the important objects of this invention is to provide a pulley mounting particularly adapted for use with Venetian blinds, which, with its appurtenances, can be readily used in either a right or a left hand position with relation to the major plane of the blind.

Another important object of this invention is to provide, in a pulley mounting, means for readily converting the direction of pull of a rope or the like, from an upward vertical motion to a downward vertical or angular motion, while at the same time carrying the direction of the rope through an angle which is in a horizontal plane.

Still another and further object of this invention is to provide a pulley mounting which comprises a supporting plate provided with a number of attaching pins or bolts certain of which may be used alternatively as pulley supporting axles.

Other and further important objects of the invention will be apparent from the disclosures in the accompanying drawings and following specification.

The invention, in a preferred form, is illustrated in the drawings and hereinafter more fully described.

In the drawings:

Figure 1 is a front elevation of the upper portion of a Venetian blind, showing the improved pulley mounting of this invention applied thereto.

Figure 2 is a top plan view of one end of the blind shown in Figure 1.

Figure 3 is a top plan view of the other end of the blind illustrating the alternative form of the pulley mounting.

Figure 4 is a sectional view taken on the broken line 4—4 of Figure 2.

As shown in the drawings:

The reference numeral 10 indicates generally the main supporting element or upper member of a Venetian blind comprising the usual slats 12 and operating strips 14. Suitable brackets 16 are attached to the member 10 for properly positioning and supporting the blind.

As best shown in Figure 2, cords or ropes 18 are provided for raising the slats 12 whenever desired, these cords or ropes passing downwardly through the slats and being trained at their upper ends over pulley wheels 20 and 22. The construction of these pulley wheels is in itself a novel feature and forms the subject of a separate application for a patent filed of even date herewith.

After passing over the pulley wheels 20 and 22, which are mounted in the member 10, the cords 18 are trained horizontally through a slot or other opening 24 formed in the member 10 and thence, in the event of a right hand operation, around a pulley wheel 30, as best shown in Figures 2 and 4.

This pulley wheel 30 is mounted on an axle pin or shaft 32 passing through an opening in a plate 34, which is affixed to the top of the member 10 adjacent the right hand end thereof and the lower end of the pin or shaft 32 is driven into the material of the member 10 as best shown in Figure 4. In the case of a bolt being used instead of a pin or spike, it may pass through an opening in the member 10 and be fastened by a nut at its lower end. Other fastening pins 36 and 38 are provided, maintaining the plate 34 in desired position. Suitable grooves or openings are made in the member 10 to provide a free passage for the ropes or cords 18, which then pass over another pulley-wheel 40 mounted in the outer end of the plate 34 and between two downwardly extending integral portions thereof, as best illustrated at 42 in Figures 1 and 4.

Whenever it is desirable or expedient to operate the cords or ropes 18 from the left hand end of the blind, the plate 34 is transferred to the left hand end of the member 10, the cords 18 being carried over the pulleys 20 and 22 in a reversed position, as best indicated in Figure 3. The pulley wheel 30 is then transferred from its original axle 32 to a new pin or axle 38 which passes through an opening in the opposite side of the plate 34, the pin or bolt 32 then merely serving as a fastening element for the plate in conjunction with the remaining pins 36. This construction is best illustrated in Figure 3 and it will be evident that the ropes, or cords 18 can be positioned at the left hand side of the blind without the use of additional equipment and with simply a few minor changes in the construction.

I am aware that many changes may be made and numerous details of construction varied throughout a wide range without departing from the spirit of this invention, and I therefore do not purpose limiting the patent granted hereon otherwise than as necessitated by the prior art.

I claim as my invention:

1. A pulley mounting, including a supporting plate, two pulley wheels removably mounted at right angles to each other in the plate, and means for alternating the position of one of said pulley wheels, as desired, the right-angle relationship of the wheels remaining the same, said means comprising pins capable of use both as pulley axles and plate supporting members.

2. A pulley mounting, including a supporting plate, a plurality of pulley wheels removably mounted in the plate, and means for alternating the position of certain of said pulley wheels, as desired, said means comprising pins capable of use both as pulley axles and plate supporting members, said pins passing through openings equally distant from the edges of the supporting plate.

3. A Venetian blind structure adaptable for right and left hand operation, said structure including a supporting bar, the bar being provided with grooves and openings for the passage of blind lifting cords, and pulley wheels mounted in the bar for converting vertical motion of the cords to a horizontal motion, and a further pulley mounting removably attached to the bar for converting said horizontal motion to an outward and downward motion at either end of the bar, said pulley wheel mounting comprising a removable plate, a fixed pulley in the plate, and an alternatively positioned pulley wheel shiftably mounted in the plate.

4. A Venetian blind structure adaptable for right and left hand operation, said structure including a supporting bar, the bar being provided with grooves and openings for the passage of blind lifting cords, and pulley wheels mounted in the bar for converting vertical motion of the cords to a horizontal motion, a further pulley mounting removably attached to the bar for converting said horizontal motion to an outward and downward motion, at either end of the bar, said pulley mounting comprising a removable plate, a fixed pulley wheel in the plate, an alternately positioned pulley wheel shiftably mounted in the plate, and supporting pins for the plate, certain of said supporting pins being capable of additional use as pulley axles.

In testimony whereof I have affixed my signature.

ROBERT W. BISSELL.